United States Patent
Brothers

(10) Patent No.: US 7,450,263 B1
(45) Date of Patent: Nov. 11, 2008

(54) SYSTEM AND METHOD FOR IMAGE ROTATION

(75) Inventor: Kent Brothers, North Vancouver (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 1078 days.

(21) Appl. No.: 10/427,166

(22) Filed: Apr. 30, 2003

Related U.S. Application Data

(60) Provisional application No. 60/465,220, filed on Apr. 25, 2003.

(51) Int. Cl.
G06F 15/00 (2006.01)
G06K 9/34 (2006.01)

(52) U.S. Cl. ........................................ 358/1.2; 382/176

(58) Field of Classification Search ................. 358/1.1, 358/1.18, 3.15, 1.9, 1.12, 448; 101/401.1; 382/176; 347/3
See application file for complete search history.

(56) References Cited

U.S. PATENT DOCUMENTS

| | | | | |
|---|---|---|---|---|
| 5,113,494 | A * | 5/1992 | Menendez et al. | 345/502 |
| 6,441,914 | B1 * | 8/2002 | Barak et al. | 358/1.14 |
| 6,930,798 | B1 * | 8/2005 | Kaneko | 358/1.9 |
| 6,963,422 | B2 * | 11/2005 | Unno | 358/1.18 |
| 7,173,719 | B2 * | 2/2007 | Bearss et al. | 358/1.13 |
| 7,206,083 | B2 * | 4/2007 | Shimada | 358/1.14 |

* cited by examiner

Primary Examiner—Saeid Ebrahimi Dehkordy
(74) Attorney, Agent, or Firm—Nelson Adrian Blish

(57) ABSTRACT

A prepress system includes a raster image processor (RIP) which produces RIP data. The system includes a rotation system which modifies the RIP data to rotate images defined by the RIP data. The rotation may be used to assist in the reduction of ghosting in printed images. The rotation may be performed by sequential shear operations.

16 Claims, 7 Drawing Sheets

| $A_{1,1}$ | $A_{1,2}$ | $A_{1,3}$ | $A_{1,4}$ | ... | $A_{1,j}$ | $A_{1,j+1}$ | ... | $A_{1,n}$ |
|---|---|---|---|---|---|---|---|---|
| $A_{2,1}$ | $A_{2,2}$ | $A_{2,3}$ | $A_{2,4}$ | ... | $A_{2,j}$ | $A_{2,j+1}$ | ... | $A_{2,n}$ |
| ... | | | | ... | | | ... | ... |
| $A_{i,1}$ | $A_{i,2}$ | $A_{i,3}$ | $A_{i,4}$ | ... | $A_{i,j}$ | $A_{i,j+1}$ | ... | $A_{i,n}$ |
| ... | ... | ... | ... | ... | ... | ... | ... | ... |
| $A_{m,1}$ | $A_{m,2}$ | $A_{m,3}$ | $A_{m,4}$ | ... | $A_{m,j}$ | $A_{m,j+1}$ | ... | $A_{m,n}$ |

SYSTEM AND METHOD FOR IMAGE ROTATION

CROSS REFERENCE TO RELATED APPLICATION

This application claims the benefit of U.S. application No. 60/465,220 filed on 25 Apr. 2003 and entitled SYSTEM AND METHOD FOR IMAGE ROTATION.

TECHNICAL FIELD

The invention relates to printing and has particular application in computer-to-plate imaging systems.

BACKGROUND

Printing most typically involves transferring ink from an inked image on a printing plate or other imaged printing medium to a suitable substrate. Printing is often performed using a printing press in which a printing plate on a rotating print cylinder is brought into contact with a substrate to be printed on.

There are a great many parameters that affect the quality of a printed image. Under some circumstances it can be advantageous to rotate an image slightly relative to the print cylinder. For example, small rotations of images on a print cylinder, such as rotations on the order of one degree, can be used to reduce ghosting. Ghosting is the occurrence of unwanted areas of higher or lower ink density. Ghosting results from interactions between the layout of an image being printed and the inking system of a printing press. Ghosting is particularly noticeable in areas which include a boundary between an uninked area and an inked area which extends parallel to the direction of substrate travel.

In film-based printing, skilled press operators will sometimes place films at an angle to printing plates while exposing the printing plates in order to reduce ghosting problems. This is typically done after examination of a film or a proof by someone who has experience with this type of printing problem. In many modern computer-to-plate printing systems or in printing presses in which the image is carried on a printing sleeve there is no film and so this approach is not possible. Instead, images must be digitally rotated. The rotated images can then be imparted to the printing plate or sleeve.

U.S. Pat. No. 6,441,914 discloses a computerized prepress system which includes a facility for automatically detecting situations in which ghosting is likely to occur and electronically angling an image and/or inserting ghosting prevention bars to reduce or eliminate ghosting. This patent does not describe how to accomplish image rotation.

Various image rotation algorithms exist. Many such algorithms are unsuitable for use in a printing environment. Some existing methods for rotating an image may introduce various visible artifacts or distort the printed image unacceptably. Further, some prior art image rotation algorithms are memory intensive, computationally intensive and/or I/O intensive. The use of such algorithms is undesirably inefficient. Such algorithms can may also be impractical or even impossible to implement within the hardware and software constraints of certain printing systems.

In view of the foregoing, there is a need for practical systems and methods for rotating images through small angles. It is desirable that such practical systems not significantly slow the transmission of image data to an imaging device.

SUMMARY OF THE INVENTION

The invention relates to methods and apparatus which have particular application in computer prepress systems. One aspect of the invention provides a method for rotating images. The method comprises obtaining a stream of image-containing data (RIP data) from a raster image processor ("RIP") and subsequently modifying the stream of RIP data to rotate images defined by the RIP data.

Specific embodiments of the invention exploit the fact that a rotation can be decomposed mathematically into three shear operations. In such embodiments, modifying the stream of RIP data comprises: applying a first shearing operation to the stream of RIP data to yield first sheared data, applying a second shearing operation to the first sheared data to yield second sheared data; and, applying a third shearing operation to the second sheared data to yield the modified RIP data. The first and third shearing operations shear in a first direction and the second shearing operation shears in a second direction perpendicular to the first direction. Preferably the first direction is parallel to the scan lines and the second direction is across the scan lines. In some embodiments two or more of the shearing operations are combined.

Another aspect of the invention provides computer program products which comprise media which carry computer-readable signals. The signals comprise instructions which, when executed by a computer processor, cause the data processor to execute a method according to the invention. In a specific embodiment, the instructions provide: a means for applying a first shearing operation to a stream of RIP data produced by a raster image processor in a computer prepress system to yield first sheared data, a means for applying a second shearing operation to the first sheared data to yield second sheared data; and, a means for applying a third shearing operation to the second sheared data to yield a stream of modified RIP data wherein images in the modified RIP data have orientations which are rotated relative to orientations of the images in the RIP data.

Yet another aspect of the invention provides a computer prepress system comprising a raster image processor configured to receive image data and to generate a stream of RIP data defining images, a rotation system configured to receive the RIP data and to modify the RIP data to produce a stream of modified RIP data wherein images in the modified RIP data have orientations which are rotated relative to orientations of the images in the RIP data and an interface to an imaging device, the interface configured to receive the modified RIP data and to send the modified RIP data to an imaging device.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
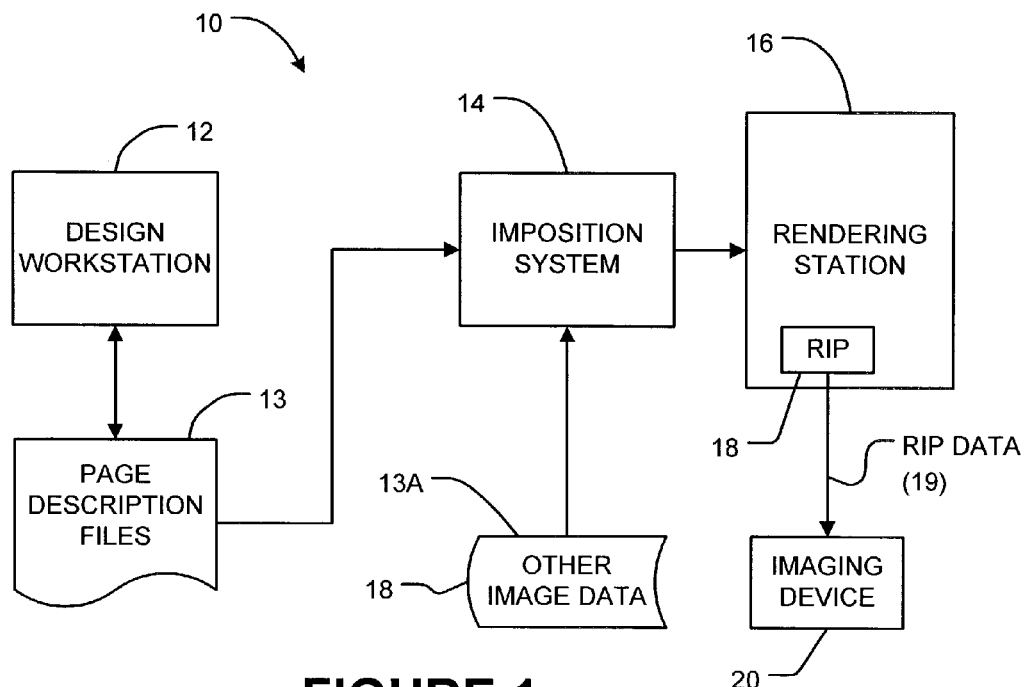
FIG. 1 is a block diagram illustrating the architecture of a computer prepress system in which the invention may be practiced.

FIG. 1 is a block diagram of a simple prior art printing system 10. System 10 is an example of a system in which a method of the invention may be performed to provide image rotation. Printing system 10 comprises a designer workstation 12 which runs software which a designer uses to create page description files 13. Page description files 13 may be in any suitable format. For example, page description files 13 may be in Postscript™ format, Adobe™ PDF format, Tagged Image File Format (TIFF), a lower level format such as CTLW, or the like. Page description files 13 define images to be imparted to a printing medium by system 10.

Page description files 13 are provided to an imposition system 14. Imposition system 14 arranges images to be imparted to a suitable medium by an imaging device 20. Imposition system 14 may arrange groups of images to be imparted to the medium. For example, a single printing sleeve may be imaged with multiple pages of a newspaper. Imposition system 14 may comprise imposition software running on a suitable computer which may be the same computer used to generate page description files 13 or a different computer. For example, in some cases it may be desirable to reproduce multiple images represented by page description files 13 at different locations on a single medium.

Imposition system 14 may receive image representations 13 and 13A from sources other than designer workstation 12. For example, imposition system 14 may receive images in the form of copydot data to be reproduced by imaging device 20. Copydot data is high resolution bitmap data of a screened image. Copydot data may be obtained by making a high resolution scan of a screened image or by saving the output of a raster image processor (RIP).

Imposition system 14 provides output to a rendering station 16. Rendering station 16 controls imaging device 20 by way of a suitable interface (not shown in FIG. 1). Rendering station 16 may comprise a computer running raster image processing (RIP) software 18. RIP software 18 generates a RIP data stream 19 which specifies whether each pixel addressable by imaging device 20 should be imaged or not imaged.

Imaging device 20 may take any of many forms. In some embodiments of the invention, imaging device 20 is integrated in a printing press. In other embodiments of the invention imaging device 20 is separate from a printing press and images printing media such as printing plates, sleeves, or the like. The invention may also be applied with an imaging device 20 which produces an image on film or some other medium. Imaging device 20 may be any device capable of generating an imaged medium from image data communicated by rendering station 16. For instance, the imaging device 16 may be an imaging component of a printing press, an image setter, a proofing printer, a laser printer, a film imaging system, or any other like device.

Figure 2:
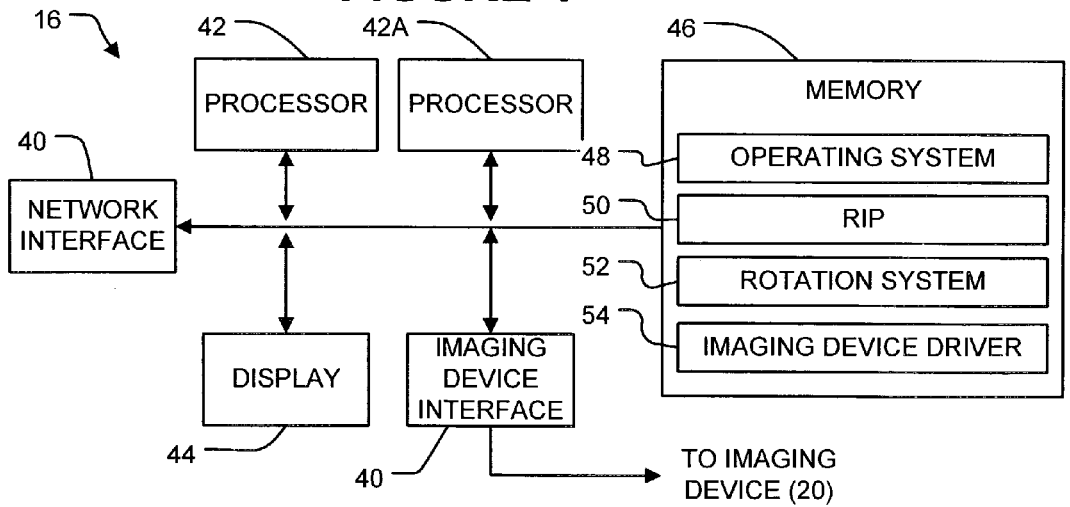
FIG. 2 is a block diagram illustrating components of a rendering station according to one embodiment of the invention.

In one embodiment of the invention, image rotation is performed on RIP data 19 after processing by RIP 18. FIG. 2 is a block diagram of major hardware and software components of a rendering station 16 as used in some embodiments of the invention. Rendering station 16 of FIG. 2 is intended only as an example of one suitable computing system in which the invention may be implemented. Those of ordinary skill in the art will appreciate that rendering station 16 may include many more components than those shown in FIG. 2 and may not include some of the components shown in FIG. 2. Although the example rendering station 16 shown in FIG. 2 conforms generally with a conventional general purpose computer workstation, those of ordinary skill in the art will appreciate that rendering station 16 may comprise any suitable data processing mechanism. For example, rendering station 16 may comprise a personal computer, network of computers, embedded data processor or the like.

Generally, the rendering station 16 of FIG. 2 includes an interface 40 for communicating RIP data 19 to imaging device 20. Rendering station 16 also includes a processor 42, a display 44 and memory 46. In the illustrated embodiment rendering station 16 includes a second processor 42A.

Memory 46 may comprise any suitable memory device or combination of memory devices accessible to processors 42 and 42A. Memory 46 may, for example, comprise a random access memory (RAM), a read-only memory (ROM), and a mass storage device, such as a disk drive. Memory 46 may also comprise one or more file servers and/or application servers accessible to rendering station 16. Memory 46 stores operating system program code 48 necessary for operating rendering station 16 and for providing a user interface. Memory 46 also stores RIP software 50, a rotation system 52 and an imaging device driver software 54.

With the exception of rotation system 52 rendering station 16 may function in a manner similar to or the same as currently known and used rendering stations. RIP software 50 runs on processor 42 under the control of operating system software 48. RIP software 50 receives image data from imposition system 14 and generates RIP data stream 19. Rip data stream 19 is output to imaging device 20 by way of imaging device interface 40.

Rotation system 52 runs on rendering station 46. Rotation system 52 intercepts the stream of RIP data produced by RIP 50 and produces modified RIP data in which images are rotated by a specified amount. Rotation systems according to the invention may be configured to rotate only by a fixed specified angle but more typically provide rotation in user specified amounts. The specified amount may be selected in any suitable manner. For example, the angle may be specified directly, the tangent of the angle may be specified, or the like.

In many applications the specified amount is a small angle. The specified amount might be 2 degrees, for example. In some applications the specified amount may be an angle of less than 6 degrees or an angle of less than 16 degrees. For the purposes of eliminating ghosting, the specified amount will often be greater than ½ degree.

The modified RIP data is delivered to imaging device 20 by way of imaging device interface 40. In the alternative, the modified RIP data could be saved to a file for later use. In some embodiments of the invention, operating system software 48 causes processes associated with rotation system 52 to run on one processor (e.g. 42 or 42A) of a multi-processor rendering station 16 while processes associated with RIP software 50 run on another processor (e.g. 42A or 42) of rendering station 16. In such embodiments the processor(s) on which rotation system 52 is running may change from time to time under control of operating system software 48.

Figures 3, 4:
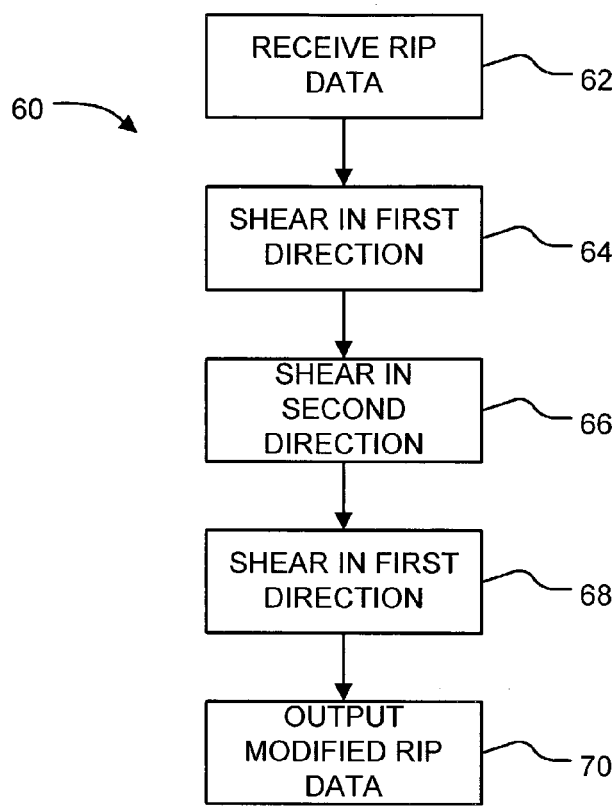
FIG. 3 is a flow chart illustrating a method according to an embodiment of the invention.
FIG. 4 is a diagram illustrating an array of pixel data.

In specific embodiments, rotation is performed by a method 60 which is illustrated in FIG. 3. Method 60 receives RIP data 19 at block 62. The RIP data contains values which indicate what, if anything, is to be printed by imaging device 20 in each pixel of an array of pixels addressable by imaging device 20. The values are typically binary values which indicate whether a particular pixel is to be marked or not. The invention is not limited to binary values however. The methods and systems described herein apply to many image formats that use any number of bits to represent a pixel, e.g., 8 bits for grayscale images, 24 bits for RGB, or 32 bits for CMYK images.

FIG. 4 illustrates a generalized array 61 of pixels. Array 61 is an m×n array and has m rows and n columns. The value corresponding to any pixel in array 61 is represented as $A_{ij}$, where the subscripts I and j respectively represent the row and column in which the pixel is located. RIP data 19 typically provides data for the scan lines of an image in sequence. Each scan line specifies the values $A_{ij}$, for a row of array 61. The values within each scan line correspond to a series of pixels.

In block 64, method 60 shears the RIP data in a first direction. The first direction is typically chosen to be the direction of the rows of array 61, which can also be called a "horizontal" direction. In block 66, method 60 shears the RIP data in a second direction orthogonal to the first direction. The second direction is typically chosen to be the direction of the columns of array 61, which can also be called a "vertical" direction. In block 68, method 60 shears the RIP data once again in the first direction. In block 70 method 60 outputs modified RIP data. Block 70 may direct the modified RIP data to imaging device 20 or to a file for later use. The modified RIP data can be handled by downstream processes and devices such as imaging device driver 54, imaging device interface 40 and imaging device 20 in the same manner as original RIP data 19. Method 60 is based upon the premise that a rotation through an angle θ, can be mathematically decomposed into three shear operations as follows:

$$\begin{pmatrix} \cos(\theta) & -\sin(\theta) \\ \sin(\theta) & \cos(\theta) \end{pmatrix} = \begin{pmatrix} 1 & -\tan\left(\frac{\theta}{2}\right) \\ 0 & 1 \end{pmatrix} \begin{pmatrix} 1 & 0 \\ \sin(\theta) & 1 \end{pmatrix} \begin{pmatrix} 1 & -\tan\left(\frac{\theta}{2}\right) \\ 0 & 1 \end{pmatrix} \quad (1)$$

In equation (1), counterclockwise rotation corresponds to positive values of θ.

Figure 4A:
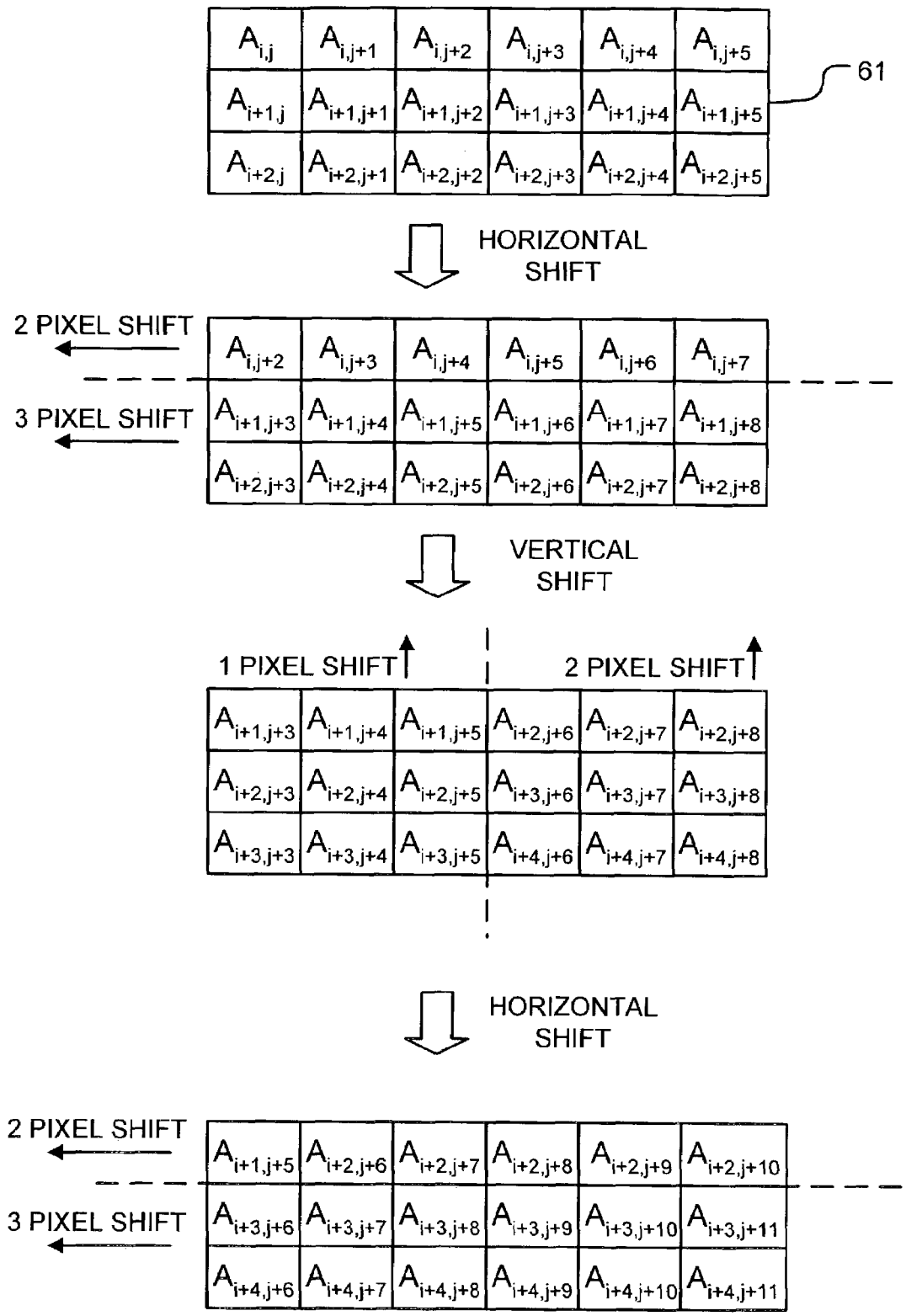
FIG. 4A is a diagram providing an example of the manipulation of pixel data corresponding to a portion of the array of FIG. 4 in a method of the invention.

FIG. 4A illustrates the effect of the operations of method 60 on the data values in a portion of array 61. The horizontal shear operations may be performed by shifting pixel values along the rows of array 61. Each row is shifted by an amount which depends on the distance of the row from the center of rotation. Where the amount of shift is a negative value then the shift is made in a direction opposite to the direction of shift for positive values of the shift amount.

If the center of rotation is at the center of array 61 then the center row of array 61 is not shifted at all by the horizontal shear operations of blocks 62 and 66 and the first and last rows of array 61 are shifted by equal amounts in opposite directions. From equation (1), the horizontal shift in pixels to be provided to a row of array 61 to implement the shear of blocks 62 and 66 is given by $-\tan(\theta/2)$ times the distance in pixels of the row from the center of rotation. Where array 61 has an even number of scan lines then it is often convenient to place the center of rotation between scan lines in the center of array 61.

One complication is that each row can only be shifted by an integral number of pixels. If one chooses $N=1/\sin\theta$ (where $0<\theta\leq 45$ degrees) then it can be shown that:

$$\frac{1}{\tan\left(\frac{\theta}{2}\right)} = N + \sqrt{N^2 - 1} \quad (2)$$

If the exact angle of rotation is unimportant, as is typically the case with small angle rotations used to reduce ghosting, then, to simplify calculation, the value of N may be set to an integer value corresponding to a suitable rotation angle. For example, in a case where the desired angle of rotation is "approximately 2 degrees" N may be set to the integer value 29 since, for an angle of exactly 2 degrees, N=28.6537 . . . . The value N=29 corresponds to an angle of 1.976 . . . degrees which is close enough to 2 degrees for many purposes.

From Equation (2) it can be seen that, assuming the pixels are equally spaced in the horizontal and vertical directions, the amount of horizontal shift should change by one pixel every $N+\sqrt{N^2-1}$ rows. If the amount of horizontal shift for the first row of array 61 is specified then the first shear may be accomplished by shifting a vertical block which includes the first $N+\sqrt{N^2-1}$ rows by the specified amount and subsequently decreasing the amount of horizontal shift by one pixel approximately every $N+\sqrt{N^2-1}$ rows.

Since $N+\sqrt{N^2-1}$ is typically not an integer quantity, even when N is an integer, it is necessary to select the locations of the rows at which the amount of horizontal shift changes to approximate the ideal shift. For N sufficiently large, $N+\sqrt{N^2-1}$ is approximately equal to 2N and so the horizontal shift can be changed by one pixel every 2N rows. To compensate for the error introduced by the fact that $N+\sqrt{N^2-1}$ is not exactly equal to 2N, each $2N^{th}$ block of rows may be reduced to have only 2N−1 rows. This is because:

$$2N - \left(N + \sqrt{N^2 - 1}\right) \approx \frac{1}{2N} \quad (3)$$

As an alternative to setting N to an integer value, a counter may be incremented to keep track of the fractional part of N and the shift amount altered by one pixel whenever the counter reaches a threshold.

In the example of FIG. 4A, the horizontal shears of blocks 64 and 68 shift the uppermost row of the illustrated portion of array 61 leftward by two pixels and the lowermost two rows of the illustrated portion of array 61 leftward by three pixels.

In one specific embodiment of the invention, the horizontal shears of blocks 64 and 68 are implemented as follows:

Start:

initialize a shift value to an initial value appropriate for the first row of the image, initialize a row pointer to point to the first row of the image, and initialize a counter to 0;

while the row pointer points to a valid row do:
  increment the counter;
  if the counter contains a value y such that y mod $(4N^2-1)=0$ then
    decrement the shift value;
  otherwise, if the counter contains a value y such that (y mod $(4N^2-1)$) mod $2N=0$ then
    decrement the shift value;
  shift the row pointed to by the row pointer by the current shift value;
  increment the row pointer;
end while;
End.

In another specific embodiment, the horizontal shears of blocks 64 and 68 are implemented as follows.
Start:
  initialize a shift value to an initial value appropriate for the first row of the image, initialize a row pointer to point to the first row of the image, and initialize a counter to 0;
  while the row pointer points to a valid row do:
    increment the counter by $$\frac{1}{(N+\sqrt{N^2-1})};$$

if the counter >1 then
      decrement the shift value;
      decrement the counter by 1;
    shift the row pointed to by the row pointer by the current shift value;
    increment the row pointer;
  end while;
End.

Figure 5:
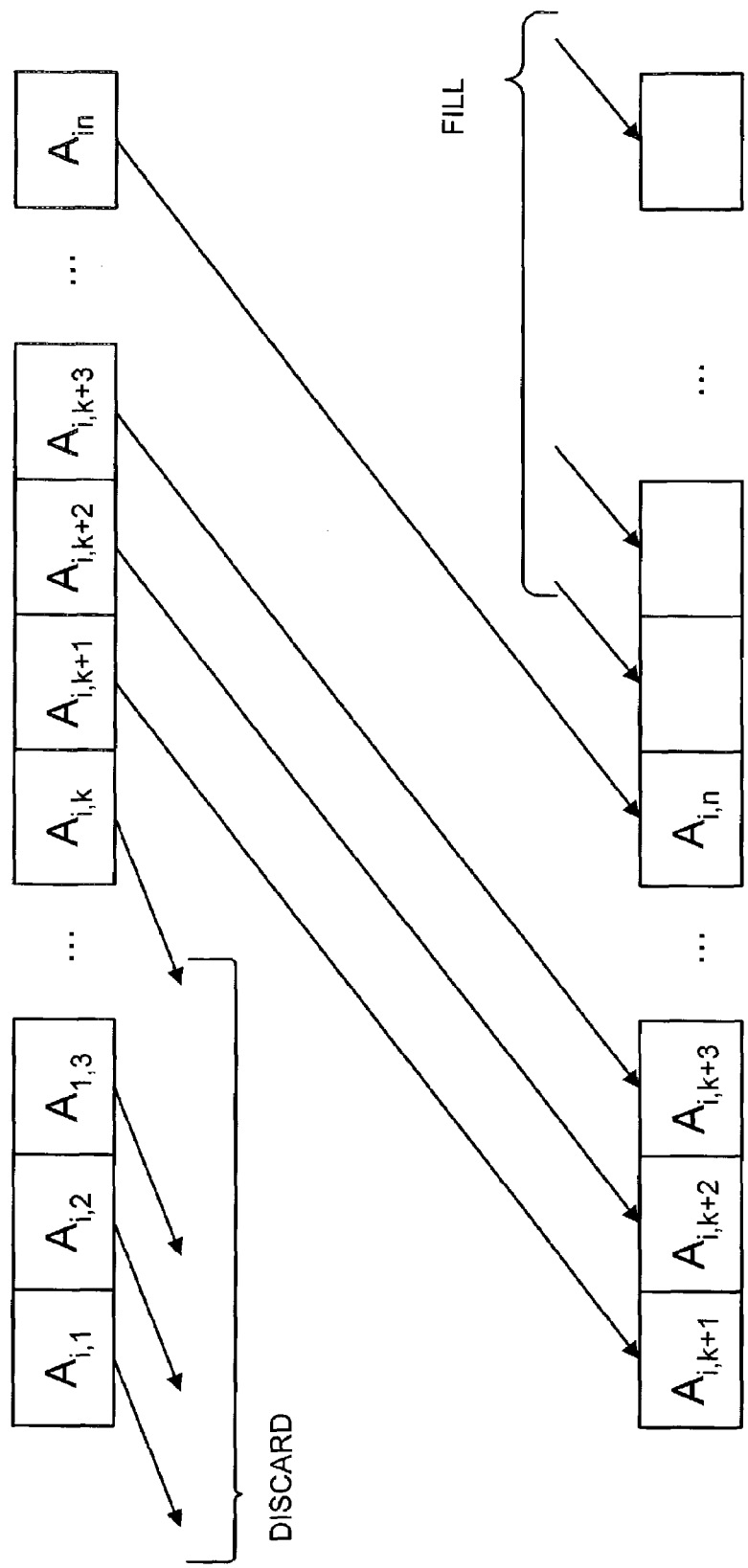
FIG. 5 is a diagram illustrating how pixel data may be moved to implement a horizontal shear.

The shifting of each row may be accomplished as shown in FIG. 5 which illustrates a situation wherein data values for the $i^{th}$ row of array 61 are shifted by k pixels. The first k data values are discarded. Most images include a margin which does not contain any important printing information. The discarded pixels of any row typically are within the margin and do not contain any important printing information. The angle of rotation is chosen so that important content is not rotated out of the imageable area. The remaining data values are shifted by k pixels so that value $A_{i,k}$ is moved to the first pixel position in the row and so on. The last k pixels positions in the row are padded with non-imaging values (i.e. the values used for the last k pixels in the row are typically selected to be values which do not result in imaging device 20 making marks in the corresponding pixel positions.

The vertical shear operation of block 66 can be accomplished by shifting pixel values in array 61 in the vertical direction. The number of pixels to shift the pixel values in each column of array 61 depends upon the horizontal distance of the column from the center of rotation. From equation (1) it can be seen that the desired amount of vertical shift increases or decreases by one pixel every N columns (where N has an integer value).

Figure 6:
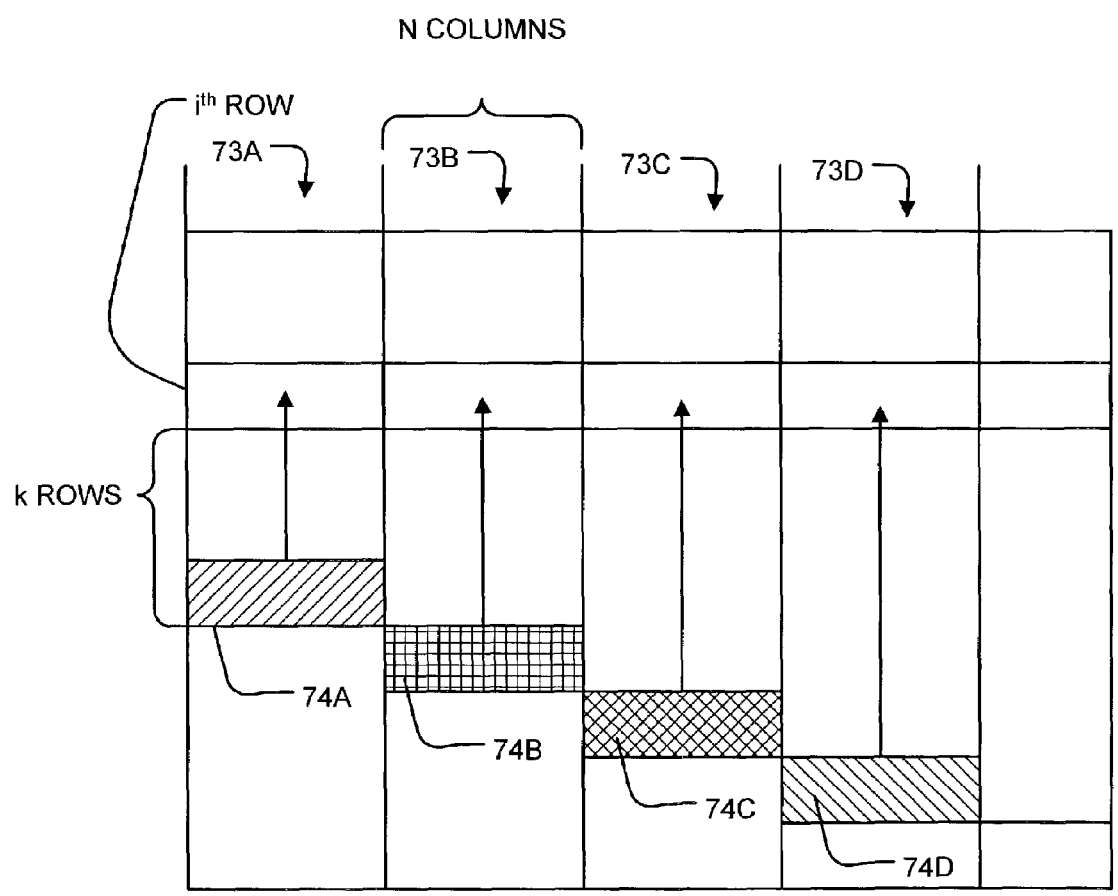
FIG. 6 is a diagram illustrating how pixel data may be moved to implement a vertical shear.

FIG. 6 illustrates how pixel values may be moved within a portion of array 61 to implement a vertical shear. Array 61 is conceptually divided into vertical strips (i.e. strips extending perpendicular to the rows of array 61). Each strip comprises N (or approximately N) pixel columns. Pixel values within each strip are shifted vertically by the same number of rows. FIG. 6 shows that for an $i^{th}$ row of array 61 blocks of data are shifted upward (i.e. in a direction of smaller row number). For a first strip 73A of N columns, data 74A is brought to the $i^{th}$ row from the $(I+k)^{th}$ row of array 61. In an adjoining strip 73B data 74B is moved upward by k+1 rows. In strips 73C and 73D, blocks 74C and 74D are respectively brought upward by k+2 rows and k+3 rows.

In the example of FIG. 4A, the leftmost three columns of the illustrated portion of array 61 are shifted upward by 1 pixel while the rightmost three columns of array 61 are shifted upwardly by 2 pixels.

As is the case with the horizontal shear described above, a few data values corresponding to pixels near some portions of the edge of array 61 will be discarded. Such pixels are typically in margin regions and are not important to the image. Some data values typically need to be filled with non-imaging data because array 61 does not include values which can be shifted to fill them.

Where N is not rounded to an integer then the number of pixel columns in each strip may be varied so that, the average number of pixel columns in each strip is sufficiently close to N. This may involve regularly increasing or decreasing the number of columns in each strip on a regular or quasi-regular basis. For example, if N=28.3333 . . . then for each group of three adjacent strips, two may have 28 pixels and one may have 29 pixels. One way to implement a system which accommodates non-integer values for N is to increment a variable to keep track of the fractional part of N and to adjust a number of columns in the current strip upwardly or downwardly when the variable reaches a threshold value.

Figure 7:
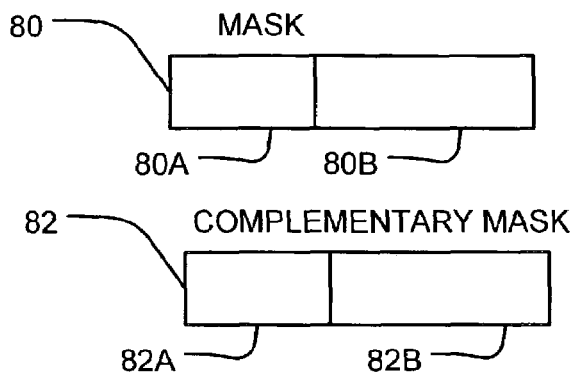
FIG. 7 is a diagram illustrating a pair of complementary masks that may be used to assemble words which cross a strip boundary.

In practice it is usually most efficient and convenient to move data in blocks which are equal to a word length of rendering station 16. For example, some current workstations move data most efficiently as 64 bit words. The boundaries of strips 73 will typically not coincide with word boundaries. One way to address this issue is to use a mask 80 and a complementary mask 82 as illustrated in FIG. 7 in assembling words which cross between adjacent strips 73. Mask 80 is divided at the strip boundary into a first portion 80A and a second portion 80B. First portion 80A contains logical "1" values and second portion 80B contains logical "0" values. In complementary mask 82, first portion 82A contains logical "0" values and second portion 80B contains logical "1" values.

To obtain a word crossing a boundary between a first strip 73 and a second strip 73 in an output row, mask 80 can be logically bitwise ANDed with a corresponding word in the row from which data in the first strip is being brought and complementary mask 82 can be logically bitwise ANDed with a corresponding word in the row from which data in the second strip is being brought. The results of these AND operations can be combined using a logical bitwise OR operation to yield the word required for the output row. Depending upon the angle of rotation and word size it may be necessary to use three or more masks to combine pixels from three or more scan lines to obtain some words for an output row.

The third shear operation of block 68 may be performed in substantially the same manner as the first shear operation of block 64, which is described above.

Those skilled in the art will appreciate from the foregoing that it is not necessary for rotation system 52 to maintain in memory the entire array 61. Rotation system 52 can process RIP data 19 serially. Rotation system 52 need only maintain in memory enough of RIP data 19 to provide the values for the current output row. In some embodiments, rotation system 52 outputs a first scan line of the modified RIP data before receiving a last scan line of the RIP data.

Figure 8:
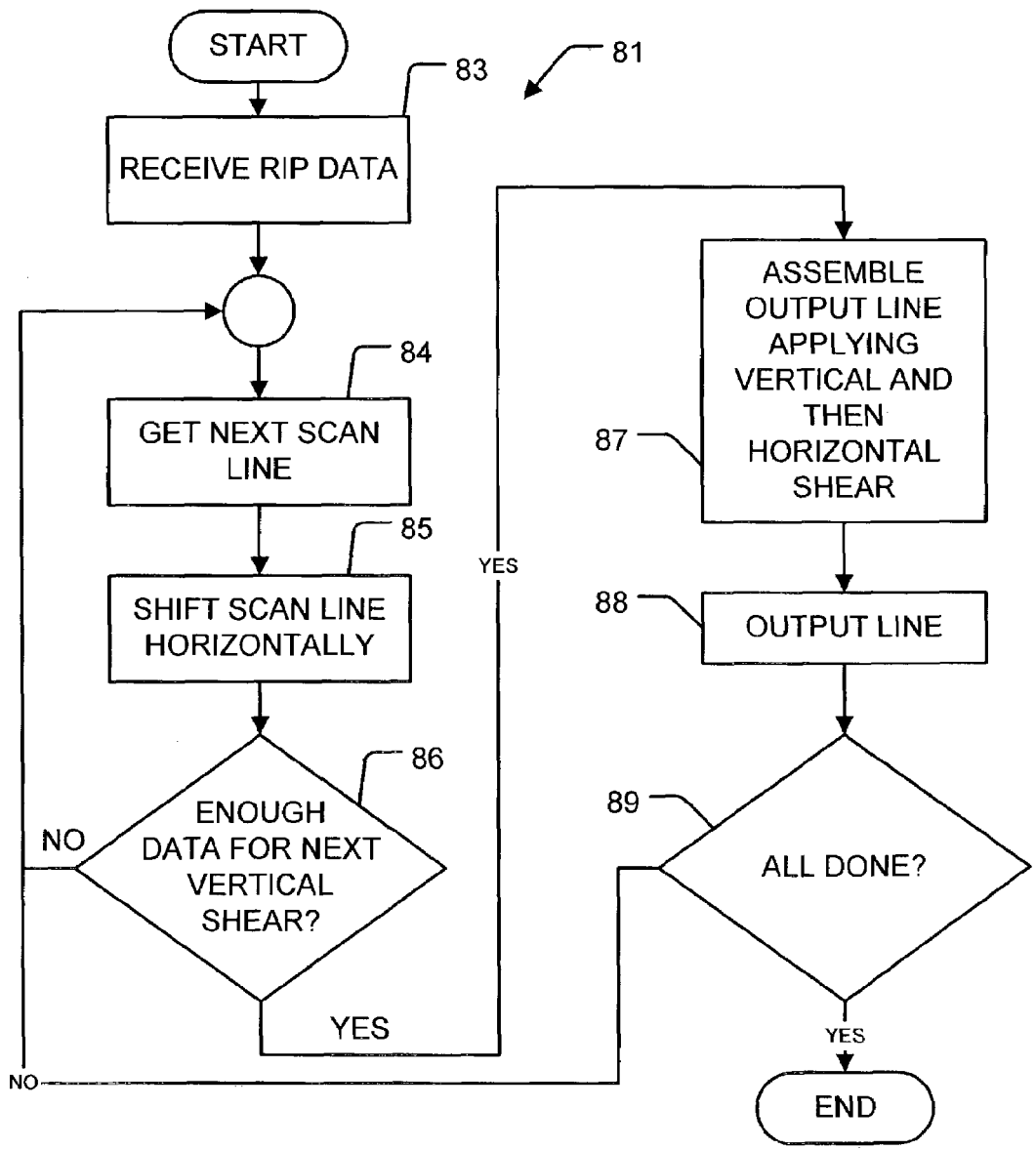
FIG. 8 is a flowchart illustrating a method for producing modified RIP data according to one specific embodiment of the invention; and, FIG. 9 is a schematic diagram illustrating the operation of a mechanism for implementing a second shear operation according to an embodiment of the invention.

FIG. 8 illustrates a method 81 for continuously producing modified RIP data from a stream of unmodified RIP data according to one embodiment of the invention. At block 83 RIP data is received. The RIP data may be received as a continuous data stream, a series of data blocks or the like. At block 84 a next scan line in the RIP data is located. The next scan line is shifted horizontally in block 85. If block 86 determines that enough scan lines have been processed by block 85 to perform a vertical shear operation (in block 87) then processing continues at block 87 otherwise, method 81 loops back to block 84 to process another scan line of the RIP data.

When block 86 determines that block 85 has processed enough scan lines to perform a vertical shear operation then processing continues at block 87 where a vertical and horizontal shear operations are performed to yield the next scan line of modified RIP data. The next scan line of modified RIP data is output in block 88. When block 89 determines that there is no more RIP data to process then method 81 terminates. Otherwise, processing continues at block 84.

Figure 9:
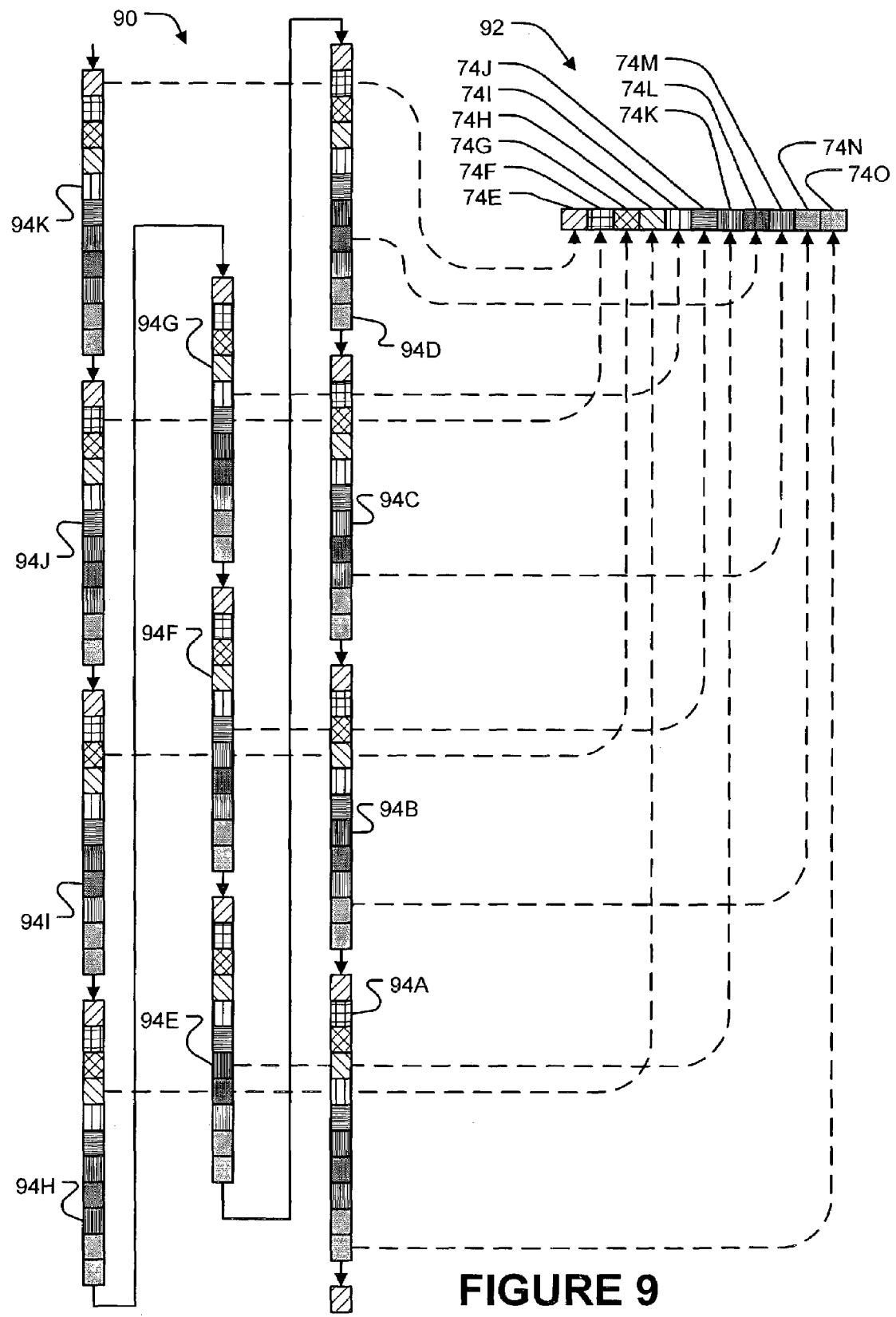

FIG. 9 illustrates the construction of a scan line 92 of vertically sheared data from a data stream 90. Data stream 90 has a series of scan lines 94 each of which contains a number of pixel values.

In the situation illustrated in FIG. 8, N has a value such that each scan line has exactly eleven blocks of pixels. Scan line 92 is the $r^{th}$ scan line of the second sheared data, where r is an index identifying the scan line. Scan line 92 is made up of blocks 74E through 74O. Each scan line of first sheared data stream 90 is also made up of blocks 74E through 74O.

A center block 74J of scan line 92 is not shifted. Center block 74J contains data from the center block of the $r^{th}$ scan line 94F of data stream 90. Blocks 74K through 74O of scan line 92 are copied from scan lines of data stream 90 which are ahead of scan line 94F. Blocks 74E through 74I are copied from scan lines of data stream 90 which are after scan line 94F in data stream 90. Adjacent blocks of scan line 92 contain data copied from adjacent scan lines of data stream 90. The blocks of scan line 92 may be assembled in any suitable order.

It can be seen that each scan line 92 can be assembled using data from only P scan lines of data stream 90 where P is the number of blocks 74 (including any partial blocks 94) within scan line 92. Therefore, only a limited amount of data from data stream 90 need be available to the mechanism which assembles scan line 92.

Those skilled in the art will readily understand that the aspect of the invention illustrated in FIG. 9 may be practised in various ways and FIG. 9 is intended only as an illustration. For example, the mechanism may have multiple scan lines 92 at different stages of assembly at the same time. Further, the first, second and third shear operations may be separate from one another or two or more of the first second and third shear operations may be combined. For example, a mechanism performing the vertical shear operation illustrated in FIG. 9 may implement the first shear operation of block 64 by reading data to be copied to scan line 92 from a shifted location within the source scan line 94. The mechanism could implement the third shear operation of block 68 by writing the data to a shifted location within its output scan line 92.

Some embodiments of the invention provide certain advantages over the prior art. For example, because it does not need to maintain and manipulate large volumes of image data, rotation system 52 may be integrated with other software which is capable of storing only small sections of an image file at one time. This arrangement is common in software applications that transmit and delete stored sections of an image file as new sections of the image file are received from a computer. Such an arrangement exists in raster image applications, such as printer drivers, that are configured to temporarily store a few scan lines of an image file at one time, as printer drivers purge stored scan lines as they are transmitted to a printer. In some embodiments of the invention rotation system 52 is integrated with imaging device driver 54. In preferred implementations of the invention, except for pixel values introduced as fill values, each pixel value in the modified RIP data has the same value as a corresponding pixel value in the RIP data.

In embodiments of the invention wherein rendering station 16 has multiple processors which are not all used by RIP 50 then rotation system 52 may be run on one or more processors while those processors are not being used significantly by RIP 50.

As described above, certain implementations of the invention comprise computer processors which execute software instructions which cause the processors to perform a method of the invention. For example, the invention may be provided in the form of a rendering station which includes a RIP which produces RIP data and a rotation system which modifies the RIP data to rotate the images defined thereby. The invention may also be provided in the form of a program product. The program product may comprise any medium which carries a set of computer-readable signals comprising instructions which, when executed by a computer processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The instructions may be carried by the program product in a compressed or encrypted format, in which case, the instructions are decompressed and/or decrypted prior to being executed by a computer processor.

A program product carrying instructions of a rotation system may be loaded from a computer-readable medium into memory 46 of rendering station 16 using a reading mechanism suitable for reading the instructions from the program product such as a DVD, CD ROM, floppy or tape drive (not shown).

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example,

- The invention may be applied to rotate images to be imparted to media other than printing media. For example, the invention may be applied to the rotation of images to be printed by a printing device such as an inkjet printer, a laser printer, or the like on any suitable medium.
- The precise locations at which the degree of horizontal or vertical shift changes can typically be varied slightly without unacceptably degrading the overall quality of rotated images produced by means of the invention.

The center of rotation does not need to be in the center of array 61 but could be in some other location.

While the foregoing description has assumed that imaging device 20 prints rows of pixels which have a spacing equal to a spacing between pixels within a row (i.e. the foregoing description assumes a 1:1 aspect ratio), the operation of the invention may be modified in any suitable way to take an unequal aspect ratio into account.

It is not necessary for RIP data to be arranged in memory in the form of an array 61. Any suitable data structures may be used to hold RIP data, modified RIP data or partially modified RIP data such as first sheared data.

Accordingly, the scope of the invention is to be construed in accordance with the substance defined by the following claims.

What is claimed is:

1. A method for rotating images, the method comprising: obtaining a stream of RIP data defining images, the stream of RIP data produced by a raster image processor; subsequently modifying the stream of RIP data to rotate the images defined in the RIP data; wherein modifying the stream of RIP data comprises: applying first, second, and third shearing operations to the stream of RIP data in sequence, wherein the first and third shearing operations shear in a first direction and the second shearing operation shears in a second direction perpendicular to the first direction, wherein the first shear operation yields first sheared data and the second shear operation comprises building output scan lines by assembling pixel data values from multiple scan lines of the first sheared data; and wherein assembling the pixel data values from multiple scan lines of the first sheared data comprises, for each of a plurality of blocks of N contiguous pixel data values in the output scan line, inserting a block of N contiguous pixel data values from a scan line of the first sheared data corresponding to the block.

2. A method according to claim 1 wherein the RIP data comprises a series of scan lines and the second direction is perpendicular to the scan lines.

3. A method according to claim 2 wherein the first and third shear operations each comprise shifting each of the scan lines by an amount dependent on a distance of the scan line to a center of rotation.

4. A method according to claim 1 wherein, for adjacent blocks of the output scan line, the corresponding scan lines of the first sheared data are adjacent to one another.

5. A method according to claim 1 wherein the first and third shear operations each comprises shifting each of the scan lines by an amount dependent on a distance of the scan line to a center of rotation.

6. A method according to claim 5 wherein the third shear operation comprises shifting each scan line by an amount equal to the shifting of the same scan line by the first shear operation.

7. A method according to claim 6 wherein, in the first shear operation, an amount of shifting of the scan lines is changed by one pixel after each of a plurality of consecutive blocks each having 2N scan lines.

8. A method according to claim 7 wherein, in the first shear operation, one of each 2N consecutive blocks has 2N−1 scan lines.

9. A method according to claim 7 wherein, in the first shear operation, every 2Nth one of the blocks has 2N−1 scan lines.

10. A method according to claim 1 comprising:
wherein said method is performed on a rendering station comprising a plurality of processors wherein the stream of RIP data is provided by software being executed by a first group of one or more of the processors and subsequently modifying the stream of RIP data is performed by software being executed by a second group of one or more of the processors different from the first group of processors.

11. A method according to claim 1 comprising rotating the images through an angle greater than ½ degree.

12. A method according to claim 11 comprising rotating the images through an angle less than 16 degrees.

13. A method according to claim 1 comprising outputting a first scan line of modified RIP data before receiving a last scan line of the RIP data.

14. A computer readable medium encoded with a computer program which, when executed by a computer processor, cause a data processor to execute a method comprising:
obtaining a stream of raster image processor (RIP) data defining images, the stream of RIP data; and
subsequently modifying the stream of RIP data to rotate the images defined in the RIP data;
wherein modifying the stream of RIP data comprises:
applying first, second, and third shearing operations to the stream of RIP data in sequence, wherein the first and third shearing operations shear in a first direction and the second shearing operation shears in a second direction perpendicular to the first direction;
wherein the first shear operation yields first sheared data and the second shear operation comprises building output scan lines by assembling pixel data values from multiple scan lines of the first sheared data; and wherein assembling the pixel data values from multiple scan lines of the first sheared data comprises, for each of a plurality of blocks of N contiguous pixel data values in the output scan line, inserting a block of N contiguous pixel data values from a scan line of the first sheared data corresponding to the block.

15. A computer readable medium encoded with a computer program which, when executed by a computer processor, provide:
a means for applying a first shearing operation to a stream of raster image processor (RIP) data in a computer prepress system to yield first sheared data;
a means for applying a second shearing operation to the first sheared data to yield second sheared data;
a means for applying a third shearing operation to the second sheared data to yield a stream of modified RIP data;
wherein images in the modified RIP data have orientations which are rotated relative to orientations of the images in the RIP data;
wherein the first shear operation yields first sheared data and the second shear operation comprises building output scan lines by assembling pixel data values from multiple scan lines of the first sheared data; and wherein assembling the pixel data values from multiple scan lines of the first sheared data comprises, for each of a plurality of blocks of N contiguous pixel data values in the output scan line, inserting a block of N contiguous pixel data values from a scan line of the first sheared data corresponding to the block.

16. A computer prepress system including a computer having a plurality of processors, said computer prepress system comprising:
a raster image processor configured to receive image data and to generate a stream of RIP data defining images;
a rotation system configured to receive the RIP data and to modify the RIP data to produce a stream of modified RIP data wherein images in the modified RIP data have orientations which are rotated relative to orientations of the images in the RIP data;

an interface to an imaging device, the interface configured to receive the modified RIP data and to send the modified RIP data to an imaging device;

wherein said raster image processor includes a first group of one or more of said processors and the generating of the stream of RIP data is provided by first software being executed by said first group of processors and said rotation system includes a second group of one or more of said processors and the modifying of the stream of RIP data is performed by second software being executed by said second group of processors, said first and second groups having different processors;

wherein the first shear operation yields first sheared data and the second shear operation comprises building output scan lines by assembling pixel data values from multiple scan lines of the first sheared data; and wherein assembling the pixel data values from multiple scan lines of the first sheared data comprises, for each of a plurality of blocks of N contiguous pixel data values in the output scan line, inserting a block of N contiguous pixel data values from a scan line of the first sheared data corresponding to the block.

* * * * *